APPARATUS FOR AUTOMATIC DETECTION AND ALARM OF FOULED MAGNETIC HEAD

Filed Dec. 16, 1966

United States Patent Office 3,489,862

Patented Jan. 13, 1970

3,489,862

APPARATUS FOR AUTOMATIC DETECTION AND ALARM OF FOULED MAGNETIC HEAD

Saburo Akai, Tokyo, Japan, assignor to Akai Electric Company Limited, Tokyo, Japan, a corporation of Japan Filed Dec. 16, 1966, Ser. No. 602,353
Claims priority, application Japan, July 9, 1966, 41/44,979
Int. Cl. G11b 5/44
U.S. Cl. 179—100.2 6 Claims

ABSTRACT OF THE DISCLOSURE

Apparatus for automatically detecting the fouled condition of a magnetic head which cooperates with a magnetic tape is provided for use in an audio or video tape recorder. Fouling is caused by the accumulation of foreign matter, especially magnetic particles scaled off from the tape, on the working surface of the magnetic head. Detection of a fouled condition is accomplished by passing the output of the magnetic head through a narrow band pass filter which passes a selected narrow band of higher frequency components. After rectification and phase inversion, the signal is applied to a control signal generating means such as a Schmitt trigger. If after a predetermined time interval, as determined by the time constants of the circuitry, no higher frequency components are passed by the band pass filter, a suitable signaling means or alarm is actuated in response to the output of the control signal generating means.

BACKGROUND OF THE INVENTION

Field of the invention

This invention relates to improvements in and relating to an automatic detector capable of providing an alarm in the event of the disadvantageous fouling of the working surface of a magnetic head, especially a playback or playback and record head on an audio or video tape recorder, said fouling being caused by the accumulation of magnetic particles scaled off from the magnetic tape cooperating with said head, oil and grease, dust particles and the like.

Description of the prior art

With use of tape recorders for an extended time period, the magnetic head such as a playback head is deteriorated on its working surface which is kept in sliding contact with the magnetic tape by the accumulation of foreing matter, especially magnetic particles scaled off from the tape. When an oily or greasy substance is included in the foreign matter, the solid foreign particles stick strongly on the working surface of the magnetic head in the form of a kind of paste. The working slit gap of the head is liable to be filled up by such greasy substance. When such accumulation of foreign matter takes place, the desirous intimate contact of the running tape with the working surface of the magnetic head is considerably impaired and thus the designed performance is correspondingly decreased. Especially, in this case, the level of the reproduced information of higher frequencies will be considerably attenuated, resulting in a corresponding loss of desirous high fidelity of the tone or picture quality. According to the conventional technique, however, it has been highly difficult to discriminate the reduction in the operating performance of the magnetic head caused by the aforementioned fouling, from those caused by other technical reasons.

SUMMARY OF THE INVENTION

It is therefore the main object of the invention to provide an efficient and novel means for the automatic detection of the aforementioned kind of fouling on the working surface of a magnetic head, especially a playback or playback and record head, when the fouling should become intolerable.

Another object is to provide a warning device when the aforementioned detection has been carried out.

Generally speaking, the reproduced signal from a recorded tape by means of a magnetic playback head comprises the effective recorded signal per se and various noises, for instance, such as Baukhausen noise, noises caused by possible inequality in the nature and construction of the magnetic coating on the tape and those caused by defective erasure of earlier recorded signals. These noises have, in general, a higher level than that of the amplifier noises, when considering their higher frequency components above a certain value, such as for example 8 kc./s. According to our practical experiments, higher frequency components of the signal as well as the noises are very difficult to reproduce and considerably attenuated with use of a fouled playback head in the aforementioned meaning. The basic idea of the present invention is such that the aforementioned attenuating phenomenon of higher frequency components in the reproduced signal is utilized for the detection of possible deteriorated condition on the working surface of a magnetic head, especially the playback head.

BRIEF DESCRIPTION OF THE DRAWING

These and further objects, features and advantages of the invention will become more clear when read the following detailed description of a preferred embodiment of the invention, by reference to the accompanying drawing, wherein.

DESCRIPTION OF THE PREFERRED EMBODIMENT

Figures 1, 2:
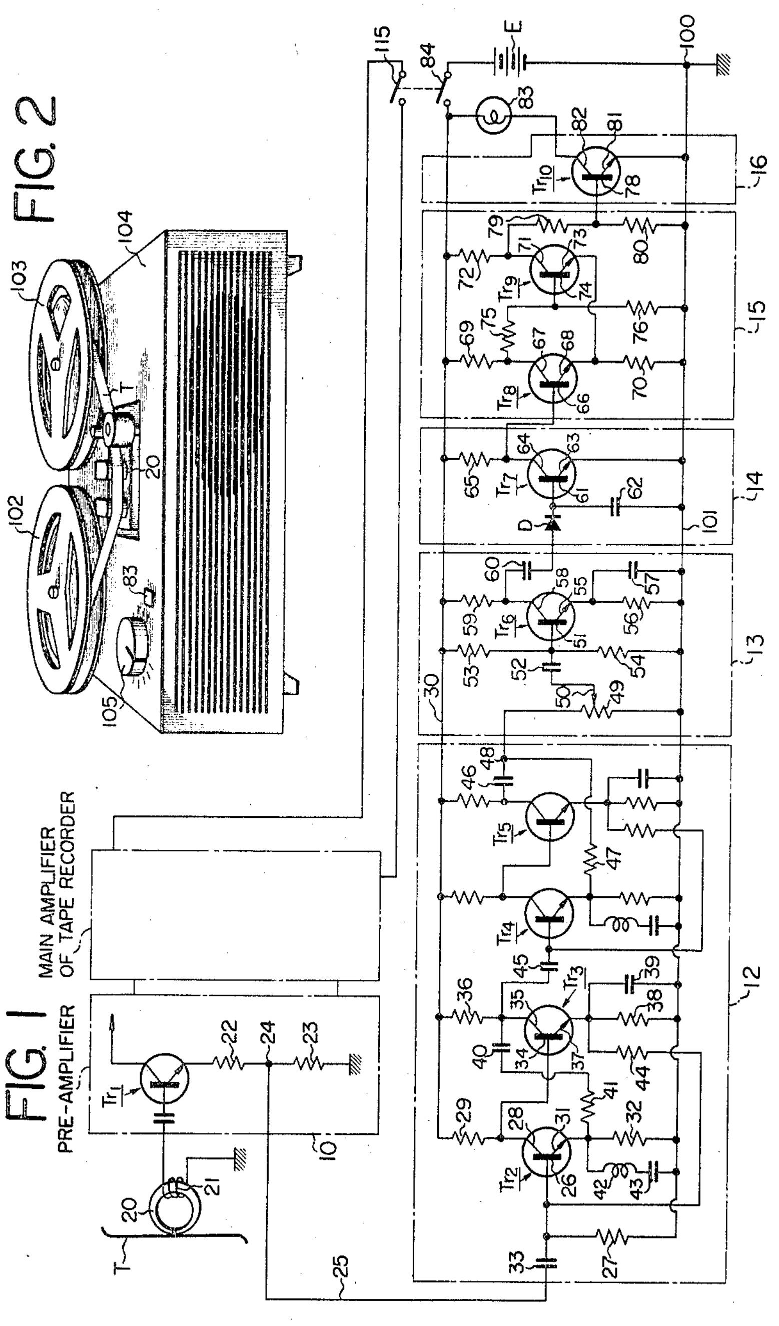
FIG. 1 is a wiring diagram of a preferred electronic circuit for the detection and alarm of a disadvantageously fouled magnetic head and employable in this invention.
FIG. 2 is a schematic perspective view of a tape recorder embodying the principles of the invention.

Now referring to the accompanying drawings, reference numeral 20 denotes a conventional reproducing or playback magnetic head which is provided with a working or pick-up coil 21 wound therearound. One end of this coil 21 is connected to ground, while another end is connected to a conventional pre-amplifier 10 of a magnetic audio or video tape recorder, said magnetic head being naturally one of the working element of said tape recorder.

The pre-amplifier 10 comprises a transistor $Tr_1$ which constitutes the first amplifying stage. Further stages have been omitted from the drawing for the simplicity of the drawing and on account of highly familiar nature of the amplifier.

A series-combination of resistors 22 and 23 is inserted between the emitter electrode of said transistor and ground, an intermediate point at 24 being connected through a conductive line 25 to the input side of a band pass amplifier 12.

The band pass amplifier 12 consists of a high peaking circuit comprising four transistors $Tr_2$, $Tr_3$, $Tr_4$ and $Tr_5$. Base electrode 26 of transistor $Tr_2$ is connected through a biasing resistor 27 and a line 101 to ground, and further through a coupling condenser 33 inserted in said line 25 to the junction 24. Collector electrode 28 of transistor $Tr_2$ is connected through a load resistor 29 to a positive line 30, while emitter electrode 31 of the transistor is connected through a resistor 32 to the ground line 101.

The positive line 30 is connected through a switch 84 to the positive pole of a D.C. source or battery denoted E, the negative pole of the latter being connected through a junction 100 to ground.

Base electrode 34 of transistor $Tr_3$ is connected directly to the collector electrode 28 of transistor $Tr_2$, while collector electrode 35 of transistor $Tr_3$ is connected through a load resistor 36 to the positive line 30. Emitter electrode 37 is connected through a parallel-combination of resistor 38 and by-pass condenser 39 to the ground line 101.

A series-connection of condenser 40 and resistor 41 is inserted between the collector electrode 35 of transistor $Tr_3$ and the emitter electrode 31 of transistor $Tr_2$, the latter emitter being further connected through a series-combination of inductor 42 and condenser 43 to the ground line 101. The series-arrangement of condenser 40, resistor 41, inductor 42 and condenser 43 constitutes a kind of negative feedback network, of which the resistor 41 serves for the adjustment of the feedback current.

In the present embodiment, the related circuit constants are so selected that the resonant frequency of the series-combination of inductor 42 and condenser 43 is in the order of 8 kc./s and that at such resonant frequency as above specified, the feedback current will become a minimum and the gain of the band pass amplifier is a certain maximum.

In order to obtain a stabilized operation of the amplifier 12, a D.C. feedback resistor 44 is inserted between the base electrode 26 of transistor $Tr_2$ and the emitter electrode 37 of transistor $Tr_3$. Collector electrode 35 of transistor $Tr_3$ is connected through a coupling condenser 45 to the base electrode of transistor $Tr_4$.

Since the design of the circuit comprising transistors $Tr_4$ and $Tr_5$ is substantially same as that of the circuit comprising transistors $Tr_2$ and $Tr_3$, no further description will be necessary without adversely affecting the better understanding of the nature of the invention.

The output of the band pass amplifier 12 is connected to the input of a signal level amplifier 13. More specifically, a junction at 48 between condenser 46 and resistor 47 forming a negative feedback circuit in the preceding amplifier stage is connected through potentiometer 49 provided in the present or second amplifier stage 13 to the ground line 101. Slider 50 of the potentiometer 49 is connected through a coupling condenser 52 to the base electrode at 51 of a transistor $Tr_6$ of the grounded-emitter configuration, for the purpose of adjusting the driving level of indicator lamp 83, as will be later described more in detail.

Base electrode 51 of transistor $Tr_6$ is connected through a resistor 53 to the positive line 30 on the one hand, and through a resistor 54 to the ground line 101, on the other. Resistors 53 and 54 are biasing resistors which serve to determine the working conditions of the transistor $Tr_6$.

Emitter electrode 55 is connected to the ground line 101 through a parallel-combination of resistor 56 and by-pass condenser 57, while collector electrode 58 is connected through a load resistor 59 to the positive line 30, and further a coupling condenser 60 to the input of a phase inverter circuit 14, as shown. Phase inverter 14 comprises a transistor $Tr_7$ and a diode D, the latter being inserted in the normal order between base electrode 61 and coupling condenser 60 for rectifying the input signal current to the transistor $Tr_7$ and to feed the rectified positive current to base electrode 61, which is connected through a smoothing condenser 62 to the ground line 101, while emitter electrode 63 is connected directly to the said line 101, and collector electrode 64 is connected through a load resistor 65 to the positive line 30.

When a positive input signal is fed from diode D to the base electrode 61, the transistor $Tr_7$ will become conductive, and thus the potential at the collector 64 will drop to that of the emitter 63 which is ground potential. When there is no input signal impressed upon the base 61, the transistor $Tr_7$ is kept in its non-conductive condition, and the potential at the collector 64 is of the same level as that of the voltage source E. On the other hand, when the input signal impressed on the base 61 of transistor $Tr_7$ is increasing, the collector voltage decreases due to the voltage drop across resistor 65. Thus, an input signal will be subjected to a phase inversion.

As shown, the collector electrode 64 of transistor $Tr_7$ is connected to the input of a control signal generating means or conventional Schmitt circuit 15 which comprises two transistors $Tr_8$ and $Tr_9$. The collector electrode 64 of transistor $Tr_7$ is connected directly to base electrode 66 of transistor $Tr_8$, while collector electrode 67 is connected through resistor 69 to the positive line 30 and emitter electrode 68 is connected through resistor 70 to the ground line 101.

Collector electrode 71 of transistor $Tr_9$ is connected through a resistor 72 to the positive line 30, while emitter electrode 73 is connected directly to the emitter electrode 68 of transistor $Tr_8$. Base electrode 74 is connected through a coupling resistor 75 to collector electrode 67 of transistor $Tr_8$ and through a resistor 76 to the ground line 101.

As well supposed from the conventional theory of Schmitt circuit, the latter operates in this embodiment as follows:

When the potential at base electrode 66 of transistor $Tr_8$ or that appearing at collector electrode 64 of transistor $Tr_7$ is zero or ground potential the former transistor is kept non-conductive. On the other hand when the said potential is equal to that of the voltage source E, the said transistor is turned to its conductive state, by properly dimensioning the resistance value of resistor 70.

Values of resistors 69, 75 and 76 are so selected that when the transistor $Tr_8$ is non-conductive, the transistor $Tr_9$ is kept conductive, and vice versa.

The output of Schmitt circuit 15 or control signal is applied to the input of a driver circuit 16 comprising a transistor $Tr_{10}$. The base electrode of which is connected through a coupling resistor 79 to collector 71 of transistor $Tr_9$, and though a resistor 80 to the ground line 101, while emitter electrode 81 of said transistor is connected directly thereto.

Indicator or alarm lamp 83 which may be replaced by an audible alarm such as a bell, buzzer or the like when necessary, is inserted between collector electrode 82 of transistor $Tr_{10}$ and the positive line 30.

When the transistor $Tr_9$ of the Schmitt circuit 15 is conductive, the base potential of the transistor $Tr_{10}$ will drop below a predetermined level and thus the transistor $Tr_{10}$ will become non-conductive, thereby preventing flow through the lamp 83 and vice versa.

The switch 84 is operatively connected with a conventional manual means for initiating the playback operation of the tape recorder which is provided with the aforementioned circuit arrangement. Thus, switch 84 is closed only when the machine is brought into its playback operation.

In FIG. 2, such tape recorder is only schematically shown wherein the magnetic tape T, the playback head 20, the alarm lamp 83, a tape feed reel 102 and a tape wind-up reel 103 are shown as mounted on the chassis panel 104 of the machine. Said manual means formed into a combined volume control and switching knob as denoted by reference numeral 105, which includes a switch 115 shown in FIG. 1.

The operation of the alarm device so far described is as follows:

When it is desired to initiate the playback operation of the tape recorder, the manual knob 105 is turned to its "on"-position and the playback sound (or picture when the machine is a video tape recorder) is properly controlled to a desired level as is conventional. By this manipulation, the switch 84 is brought into its closed position, as already described hereinabove. At the same time, the magnetic tape T is caused to run while being kept in sliding contact with the working surface of the playback head 20 as is conventional with a tape reeling mechanism including the both tape reels 102–103 brought into operation. When the tape T has been already recorded, a signal will be picked up from the tape by the working coil 21 of the head 20 and fed to the base electrode of transistor $Tr_1$ of the pre-amplifier 10, thence conveyed through resistor 22, junction point 24, lead 25 and condenser 33 to the base electrode 26 of transistor $Tr_2$ of band pass amplifier 12. This input signal comprises an effective signal recorded and to be reproduced, together with various noises as already mentioned.

As already mentioned, the band pass amplifier 12 is so designed as to have a maximum gain at 8 kc./s. of the input signal, in this case, although this specified frequency can be modified so as to be compatible with other tape speeds, the design of the record and playback magnetic heads, the nature and purpose of the tape recorder, such as, for audio or video use, and other various operating and design conditions. In the present embodiment, specific signal and noise components having 8 kc./s. as a peak thereof are accenuated and delivered from the band pass amplifier 12 to the signal level amplifier 13. Upon being amplified in the latter, the signal and noises are delivered from this amplifier 13 to the phase inverter 14.

The signal and noises fed to the inverter 14 are then rectified therein by the diode D and applied through the smoothing condenser 62 to the transistor $Tr_7$.

When the playback head 20 represents a clean working surface and high frequency components of the recorded signal with noises are reproduced without any appreciable attenuation, an input signal will be always impressed on the base electrode 61 of transistor $Tr_7$ which is thus kept in conductive condition and the collector 64 is kept at ground potential.

On the other hand, when the playback head 20 has been fouled beyond a predetermined certain degree and frequency components in the reproduced information lower than the above-specified frequency are attenuated below a predetermined level, transistor $Tr_7$ will become non-conductive and the collector 64 is kept at the potential of the voltage source E, and the input signal to the inverter will be subjected to a phase inversion, as was already referred to hereinbefore, and then fed to Schmitt circuit 15.

As was already explained, when the potential at base electrode 66 of transistor $Tr_8$ in the Schmitt circuit is kept at ground potential, substantially no output voltage will appear to the collector electrode 71 of transistor $Tr_9$. On the other hand, when the base 66 is kept at the potential of the voltage source E, substantially the same output voltage will appear at the collector 71.

When the output voltage from Schmitt circuit 15 is substantially the same as that of the voltage source E, the transistor $Tr_{10}$ of the drive circuit 16 will become conductive. On the other hand, when the output voltage becomes substantially the same as ground potential, the transistor $Tr_{10}$ will become non-conductive. In the former case, the indicator lamp 83 will be ignited to indicate the fouled condition of the playback head 20, while, in the latter case, wherein the transistor $Tr_{10}$ is non-conductive, the lamp 83 will be extinguished showing the good condition on the working surface, including the slit gap, of the playback head 20.

By adjusting the potentiometer 49, the level of the igniting current for the lamp 83 can be varied. The degree of fouling of the magnetic head 20, beyond which the lamp 83 is brought into ignition, can be thus determined by the adjustment of potentiometer 49.

A number of capacitors and resistors is seen in the whole circuit shown in FIG. 1 and they act in effect as a time constant circuit having a time constant of 20–30 seconds. Since the higher frequency components contained in the effective recorded and reproduced signal can be deemed in practice instantaneous and fluctuating nature, and thus may be disregarded when considering the whole detecting and alarming operation of the detector so far described, while the higher frequency noise components are mainly effective for the desired service.

The selected critical value of higher frequency components, 8 kc./s., has been determined from practical experiments on an audio tape recorder with a tape speed of 1⅞ in. per second. In this case, the band width of the band pass amplifier 12 extends about 1 kc. With a reduced tape speed of 15/16 in., the critical frequency may amount to about 7 kc./s. With an increased tape speed of 7½ in., the critical value may amount to about 9 kc./s.

In the case of video tape recorders operating at relative tape speeds of 30–60 in. per second with stationary magnetic heads, the critical value can be increased to 10–12 kc./s.

It will be clear from the foregoing that according to this invention, a possible fouling of the working portion of a magnetic head such as playback head can be automatically detected and, if so, the disadvantageous head condition can be instantly communicated to the user of the tape recorder by either visual or audible alarm signal.

While the invention has been particularly shown and described with reference to a preferred embodiment thereof, it will be understood by those skilled in the art that various changes in form and details may be made therein without departing from the spirit and scope of the invention.

What I claim is:

1. Apparatus for automatically detecting excessive fouling of the working surface of a magnetic head cooperating with a magnetic tape, comprising:

(a) a narrow band pass filter electrically connected with said magnetic head for the reception of the reproduced signal and noise information by said head from said tape and for the delivery of only a specifically selected narrow band of higher frequency components from said reproduced information, (b) circuit means connected to said narrow band pass filter for rectifying said high frequency components and for subjecting the rectified signal to a phase inversion, (e) control signal generating means connected to said circuit means for providing a control signal in response to the presence of the phase inverted signal, and (d) signaling means connected to said control signal generating means and actuated by the absence of said control signal.

2. Apparatus as set forth in claim 1, wherein said control signal generating means is a Schmitt trigger.

3. Apparatus as set forth in claim 2, wherein said narrow band pass filter comprises a band pass amplifier having a peaking frequency of 7 kc./s. or higher.

4. Apparatus as set forth in claim 2, wherein said signaling means comprises a visual indicator which is ignited in response to said control signal.

5. Apparatus as set forth in claim 1, wherein said circuit means includes a time constant circuit which delays the actuation of said signaling means until after said higher frequency components have been interrupted for a predetermined period of time.

6. Apparatus as set forth in claim 5, wherein the time constant of said time constant circuit is greater than 10 seconds.

References Cited

UNITED STATES PATENTS 3,282,065 11/1966 Flanagan ---------- 307—233 X

OTHER REFERENCES

Hickman, R. E. B., Magnetic Recording Handbook, 1958, George Newnes Limited, London, pp. 143 and 138.

BERNARD KONICK, Primary Examiner

ROBERT S. TUPPER, Assistant Examiner

U.S. Cl. X.R.

307—233; 340—171, 248